(12) United States Patent
Kim

(10) Patent No.: US 11,576,529 B2
(45) Date of Patent: Feb. 14, 2023

(54) CONTAINER AND COOKING APPLIANCE INCLUDING THE SAME

(71) Applicant: NUC Electronics Co., Ltd., Daegu (KR)

(72) Inventor: Jong Boo Kim, Daegu (KR)

(73) Assignee: NUC ELECTRONICS CO., LTD., Daegu (KR)

( * ) Notice: Subject to any disclaimer, the term of this patent is extended or adjusted under 35 U.S.C. 154(b) by 552 days.

(21) Appl. No.: 16/484,442

(22) PCT Filed: Apr. 23, 2019

(86) PCT No.: PCT/KR2019/004848
§ 371 (c)(1),
(2) Date: Aug. 7, 2019

(87) PCT Pub. No.: WO2019/208993
PCT Pub. Date: Oct. 31, 2019

(65) Prior Publication Data
US 2021/0353104 A1    Nov. 18, 2021

(30) Foreign Application Priority Data

Apr. 23, 2018  (KR) ........................ 10-2018-0046941
Apr. 23, 2018  (KR) ........................ 10-2018-0046942

(51) Int. Cl.
*A47J 43/00* (2006.01)
*A47J 43/07* (2006.01)
*A47J 43/046* (2006.01)

(52) U.S. Cl.
CPC ......... *A47J 43/0727* (2013.01); *A47J 43/046* (2013.01); *A47J 43/0722* (2013.01)

(58) Field of Classification Search
CPC ... A47J 43/0727; A47J 43/046; A47J 43/0722
See application file for complete search history.

(56) References Cited

U.S. PATENT DOCUMENTS

| D556,506 S | 12/2007 | Spagnolo |
|---|---|---|
| 2003/0034200 A1 | 2/2003 | Bohannon |

(Continued)

FOREIGN PATENT DOCUMENTS

| CN | 201101393 Y | 8/2008 |
|---|---|---|
| CN | 204158261 U | 2/2015 |

(Continued)

OTHER PUBLICATIONS

KR101391972 Jin machine translation (Year: 2014).*
The Extended European Search Report for European Patent Application No. 19744608.1, dated Mar. 29, 2022.

*Primary Examiner* — Anshu Bhatia

(57) ABSTRACT

Disclosed is a cooking appliance including: a main body; a container detachably installed to an upper portion of the main body, and comprising a reservoir for accommodating an object to be processed and a handle portion protruding laterally from the reservoir; and an enclosure detachably installed to the upper portion of the main body to surround the reservoir, wherein the enclosure is formed in a dome shape having an opened lower end and has a handle through hole extending from the opened lower end and formed in a part of a side surface of the enclosure, so that at least a part of the handle penetrates the handle through hole and is exposed to an outside in a state where the enclosure is installed to the main body with the container.

18 Claims, 16 Drawing Sheets

(56) References Cited

U.S. PATENT DOCUMENTS

| | | |
|---|---|---|
| 2010/0027373 A1 | 2/2010 | Barnard et al. |
| 2012/0294108 A1* | 11/2012 | Dickson, Jr. .......... B01F 27/808 |
| | | 366/205 |
| 2014/0185407 A1 | 7/2014 | Yang |
| 2016/0345779 A1 | 12/2016 | Tu |
| 2018/0220829 A1 | 8/2018 | Zhang et al. |
| 2019/0133378 A1* | 5/2019 | Kim ................... A47J 43/0716 |

FOREIGN PATENT DOCUMENTS

| | | |
|---|---|---|
| CN | 105919396 A | 9/2016 |
| CN | 107550218 A | 1/2018 |
| CN | 207136784 U | 3/2018 |
| JP | 3186917 U | 10/2013 |
| JP | 2016-73335 A | 5/2016 |
| JP | 2016073335 A | 5/2016 |
| KR | 20110043542 A | 4/2011 |
| KR | 10-1391972 B1 | 5/2014 |
| KR | 101391972 B1 | 5/2014 |
| KR | 101490099 B1 | 2/2015 |
| KR | 20180014751 A | 2/2018 |
| KR | 20180019498 A | 2/2018 |

\* cited by examiner

FIG. 8
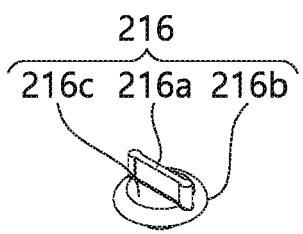
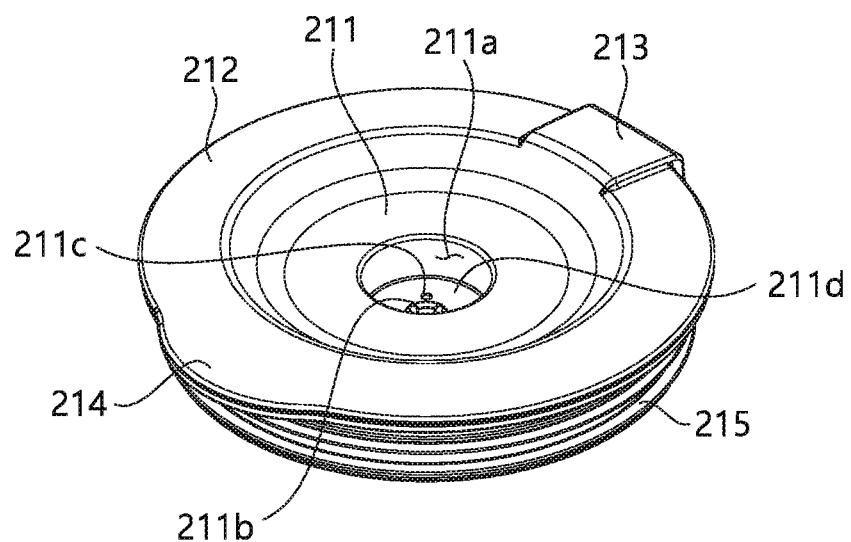
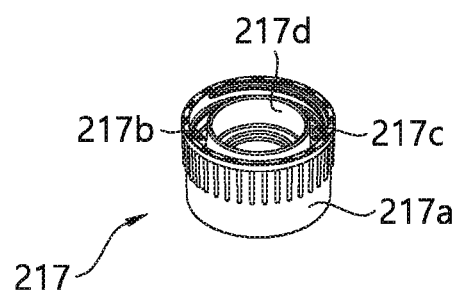

CONTAINER AND COOKING APPLIANCE INCLUDING THE SAME

CROSS-REFERENCE TO RELATED APPLICATIONS

This application is a U.S. National Stage of PCT/KR2019/004848 filed Apr. 23, 2019, which claims the priority benefit of Korean Application Nos. 10-2018-0046941, filed Apr. 23, 2018 and 10-2018-0046942, filed Apr. 23, 2018.

TECHNICAL FIELD

The present invention relates to a container and a cooking appliance including the same, and more particularly to a container for containing food to be processed and a cooking appliance including the container and an enclosure.

BACKGROUND ART

There are various types of cooking appliances such as blenders, juice extractors, kneading machines, etc. Most of the cooking appliances utilize motors to process food by rotating processing members (blades, screws, etc.).

Thus, noise is caused not just by a motor, but also by collision of a processing member, a container for accommodating food, and the food. In particular, a blander for rapidly blending food with high power makes huge noise.

Recently, in order to shield noise generating in a cooking appliance, a product having an enclosure surrounding a blander has been used.

However, as for a cooking appliance having an enclosure, the enclosure is divided into an upper part and a lower part, so food can be introduced into a container by opening the upper part of the enclosure or by separating the container from a main body, and, while the cooling appliance is in operation, the upper part of the enclosure is closed. In addition, since the enclosure is in a structure surrounding the entire of the container, the cooking appliance having the enclosure occupies a horizontal area greater than a cooking appliance having no enclosure.

DISCLOSURE

Technical Problem

An object of the present invention is to provide a cooking appliance and a new container for the cooking appliance, the cooling appliance which does not adapt a structure where an enclosure is divided into an upper part and a lower part, and which minimizes a horizontal area occupied by the cooking appliance, thereby effectively shielding noise caused by the cooking appliance.

Objects of the present invention should not be limited to the aforementioned objects and other unmentioned objects will be clearly understood by those skilled in the art from the following description.

Technical Solution

In order to achieve the above object, a cooking appliance according to an embodiment of the present invention includes: a main body; a container detachably installed to an upper portion of the main body, and comprising a reservoir for accommodating an object to be processed and a handle portion protruding laterally from the reservoir; and an enclosure detachably installed to the upper portion of the main body to surround the reservoir, wherein the enclosure is formed in a dome shape having an opened lower end and has a handle through hole extending from the opened lower end and formed in a part of a side surface of the enclosure, so that at least a part of the handle penetrates the handle through hole and is exposed to an outside in a state where the enclosure is installed to the main body with the container.

In order to achieve the above object, a container according to an embodiment of the present invention includes: a bottom surface; a blade rotatably installed on the bottom surface; a side wall forming, with the bottom surface, an accommodation space for accommodating an object to be processed; and a handle comprising a base portion protruding outwardly from the side wall, and a grip portion extending upwardly from the base portion.

The details of other embodiments are included in the following description and the accompanying drawings.

Advantageous Effects

According to embodiments of the present invention, there is at least one advantageous effect as below.

Even without adopting a structure where an enclosure is divided into an upper part and a lower part, it is possible to minimize a horizontal area occupied by a cooking appliance and effectively shield noise caused by the cooking appliance.

Effects of the present invention should not be limited to the aforementioned effects and other unmentioned effects will be clearly understood by those skilled in the art from the claims.

DESCRIPTION OF DRAWINGS

FIG. 8 is an unfolded perspective view of a lid shown in FIG. 5.

MODE FOR INVENTION

Figure 1:
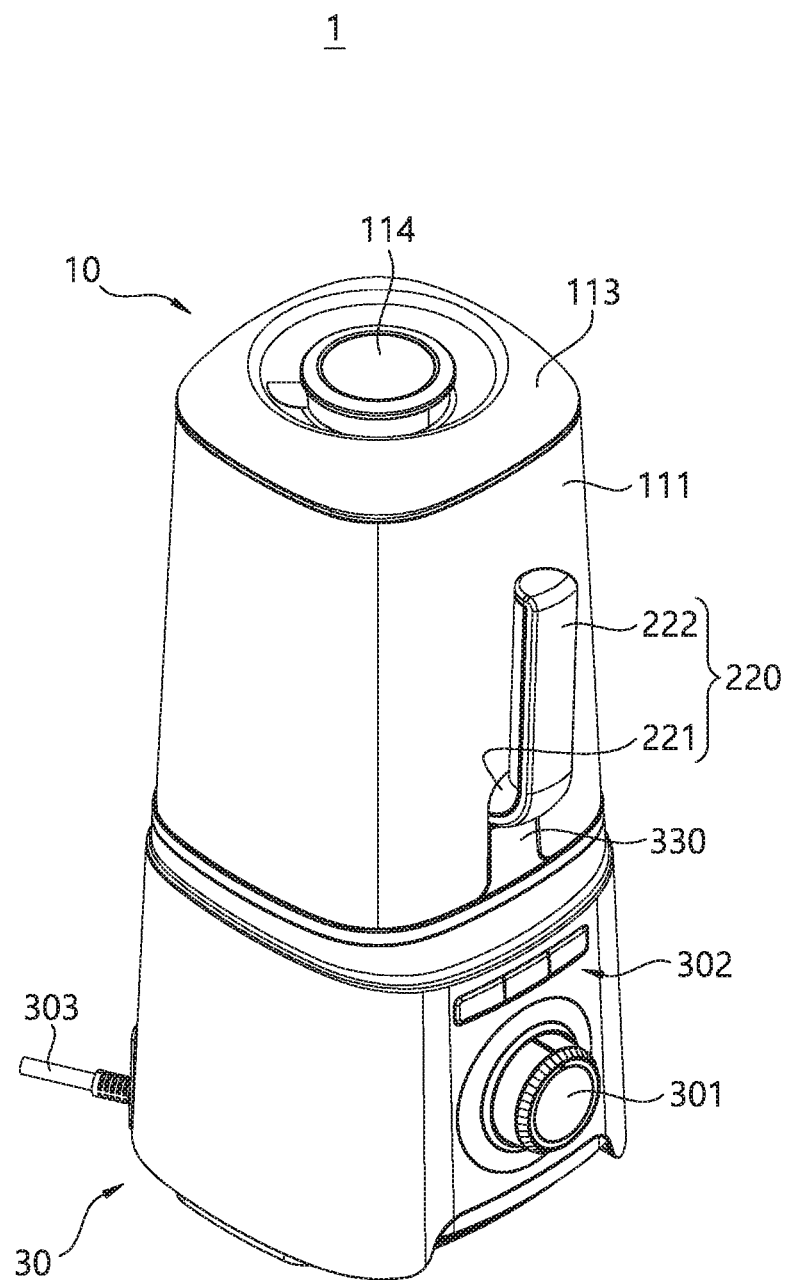
FIG. 1 is a perspective view of a cooking appliance according to an embodiment of the present invention.

Advantages and features of the present disclosure and a method of achieving the same should become clear with embodiments described in detail below with reference to the accompanying drawings. However, the present disclosure is not limited to the embodiments disclosed below and may be realized in various other forms. The present embodiments make the disclosure complete and are provided to completely inform one of ordinary skill in the art to which the present disclosure pertains of the scope of the disclosure. The present disclosure is defined only by the scope of the claims. Like reference numerals refer to like elements throughout.

In addition, embodiments herein will be described with reference to cross-sectional views and/or schematic views, which are ideal exemplary views of the present disclosure. Therefore, the form of an exemplary view may be deformed due to a manufacturing technique and/or an allowable error. In addition, in each drawing of the present disclosure, each element may have been somewhat enlarged or reduced in consideration of convenience of description. Like reference numerals refer to like elements throughout, and "and/or" includes each mentioned item and all of one or more combinations of the mentioned items.

Hereinafter, the present invention will be described with the accompanying drawings for explaining a cooking appliance according to an embodiment of the present invention.

FIG. 1 is a perspective view of a cooking appliance according to an embodiment of the present invention.

As illustrated in FIG. 1, a cooking appliance according to an embodiment of the present invention includes an enclosure 10, a container 20 (see FIG. 12), and a main body 30. As illustrated in FIG. 1, the enclosure 10 is mounted to the main body 30 while surrounding the container 20 with a handle 220 of the container 20 being exposed to the outside. The enclosure 10 of the container 20 is detachably mounted to the main body 30.

Hereinafter, elements will be described in detail in order of the enclosure 10, the container 20, and the main body 30.

Figure 2:
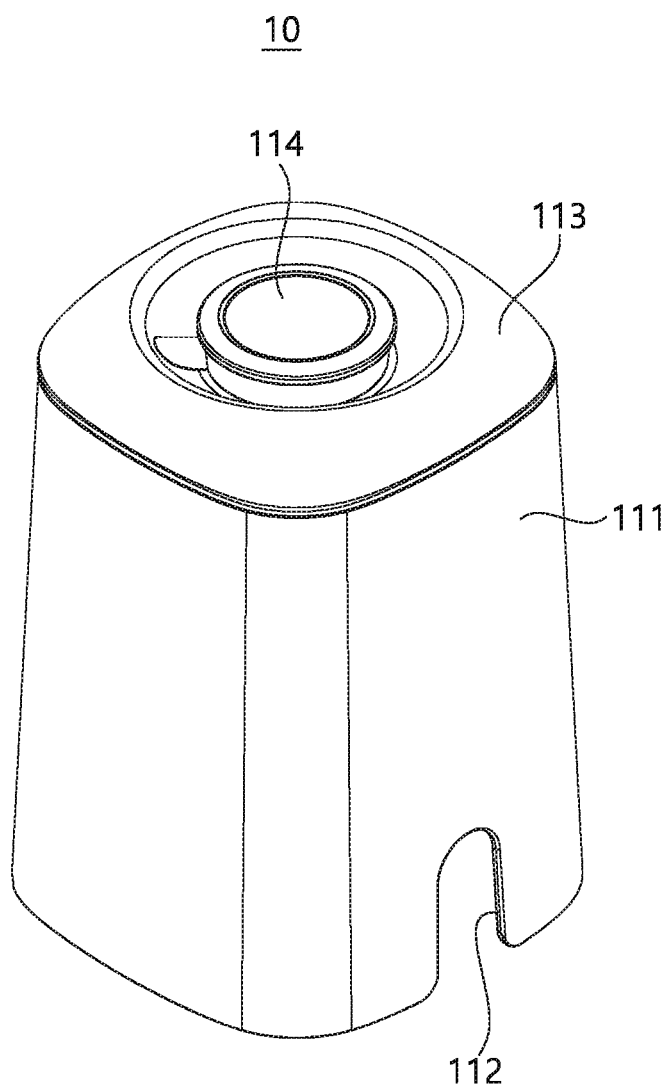
FIGS. 2 and 3 are perspective view of an enclosure shown in FIG. 1.
Figure 3:
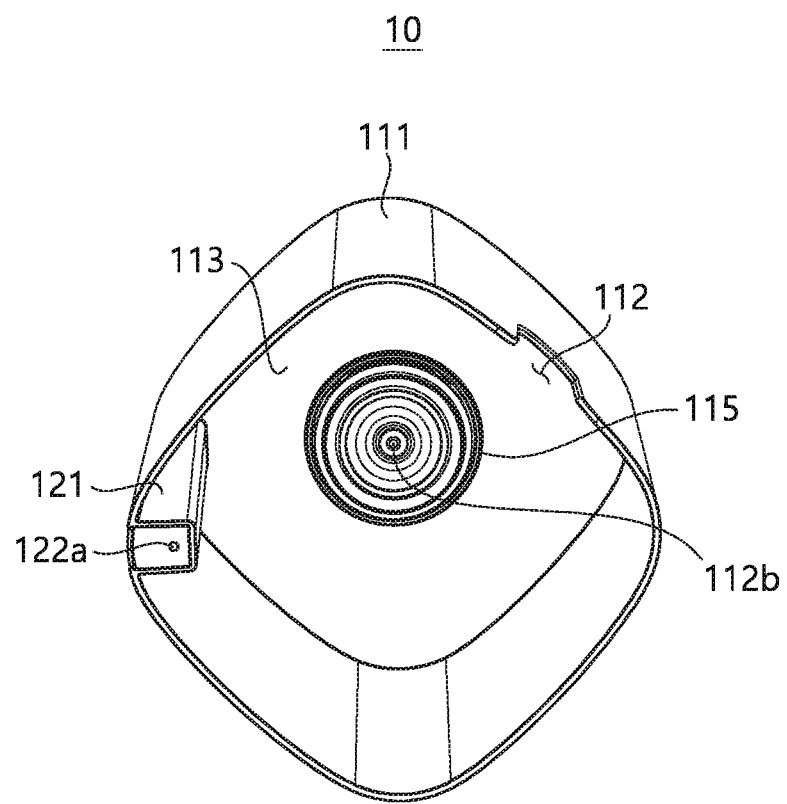
Figure 4:
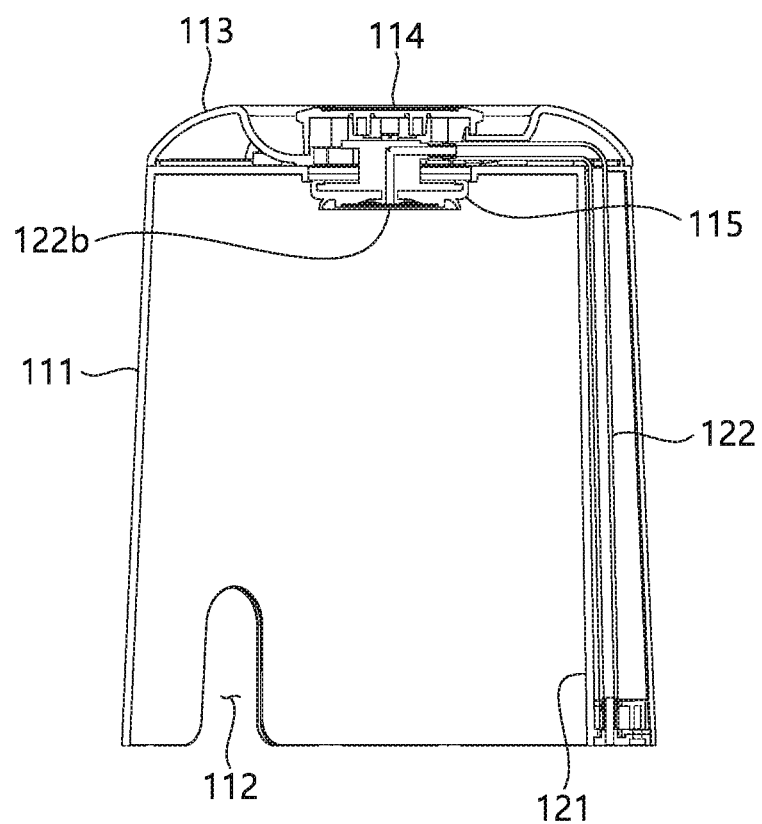
FIG. 4 is a cross-sectional view of the enclosure shown in FIG. 1.

FIGS. 2 and 3 are perspective view of an enclosure shown in FIG. 1, and FIG. 4 is a cross-sectional view of the enclosure shown in FIG. 1.

As illustrated in FIGS. 2 to 5, the enclosure 10 is formed in a dome shape which is opened at a lower end. Thus, the enclosure 10 incudes a side surface 111 surrounding the entire of the enclosure in an annular shape, and a loop 113.

In a part of the side surface 111, a handle through hole 112 extending from the opened lower end is formed.

As illustrated in FIG. 4, the enclosure 10 may include a reservoir that forms a vacuum flow path 122 (a second vacuum flow path). In addition, the vacuum flow path 122 may be installed inside the enclosure 10 along the side surface 111 and the loop 113.

The enclosure 10 may further include a cover member 121 for fixing the vacuum flow path 122 and isolating the vacuum flow path 122 from an interior space of the enclosure 10. The cover member 121 may be formed integrally with the side surface 111.

One end 122a of the vacuum flow path 122 is formed to be exposed toward a lower portion of the enclosure 10.

As illustrated in FIG. 4, the vacuum flow path 122 is formed from a lower end to an upper end of the side surface 111 along the loop 113, and the other end 122b of the vacuum flow path is formed to pass through a vacuum manipulation part 114 provided at a central portion of the loop 113 and be exposed toward the interior space of the enclosure 10.

The enclosure 10 may include a suction part 115 provided at a lower portion of the vacuum manipulation part 114 and elevated by manipulation of the vacuum manipulation part 114. The other end 122b of the vacuum flow path 122 may be exposed at the center of the suction part 115 and may be elevated along with the suction part 115. To this end, the other end 122b and the other side of the flow path 122 is preferably formed of a flexible material.

The suction part 115 is lowered by manipulation of the vacuum manipulation part 114 and thereby comes to be tightly in contact with the suction part receiving end 211 formed in a lid 210 of the container 20, which will be described later on. A detailed description thereof will be provided later on.

Figure 5:
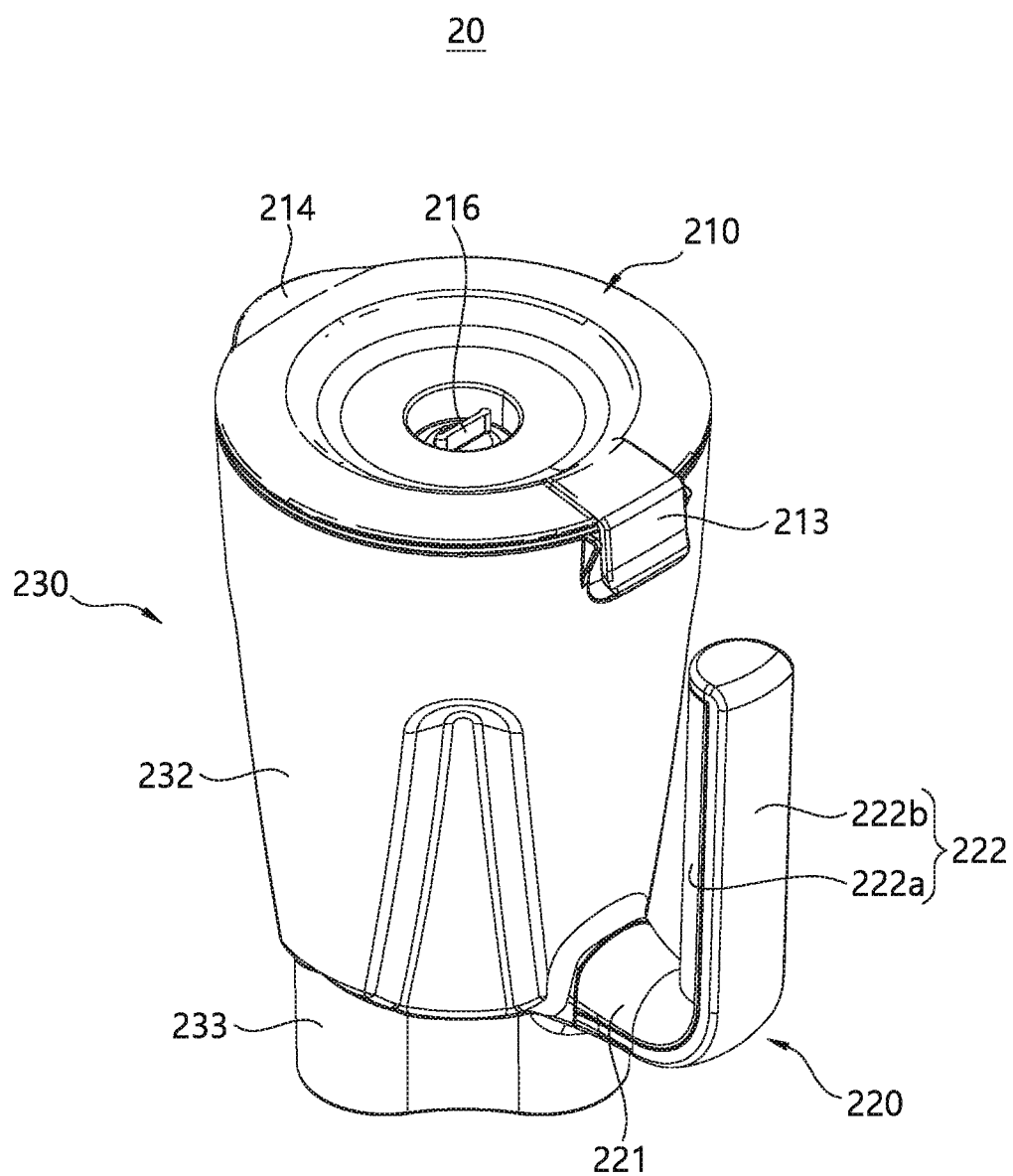
FIG. 5 is a perspective view of a container of a cooking appliance according to an embodiment of the present invention.
Figure 6:
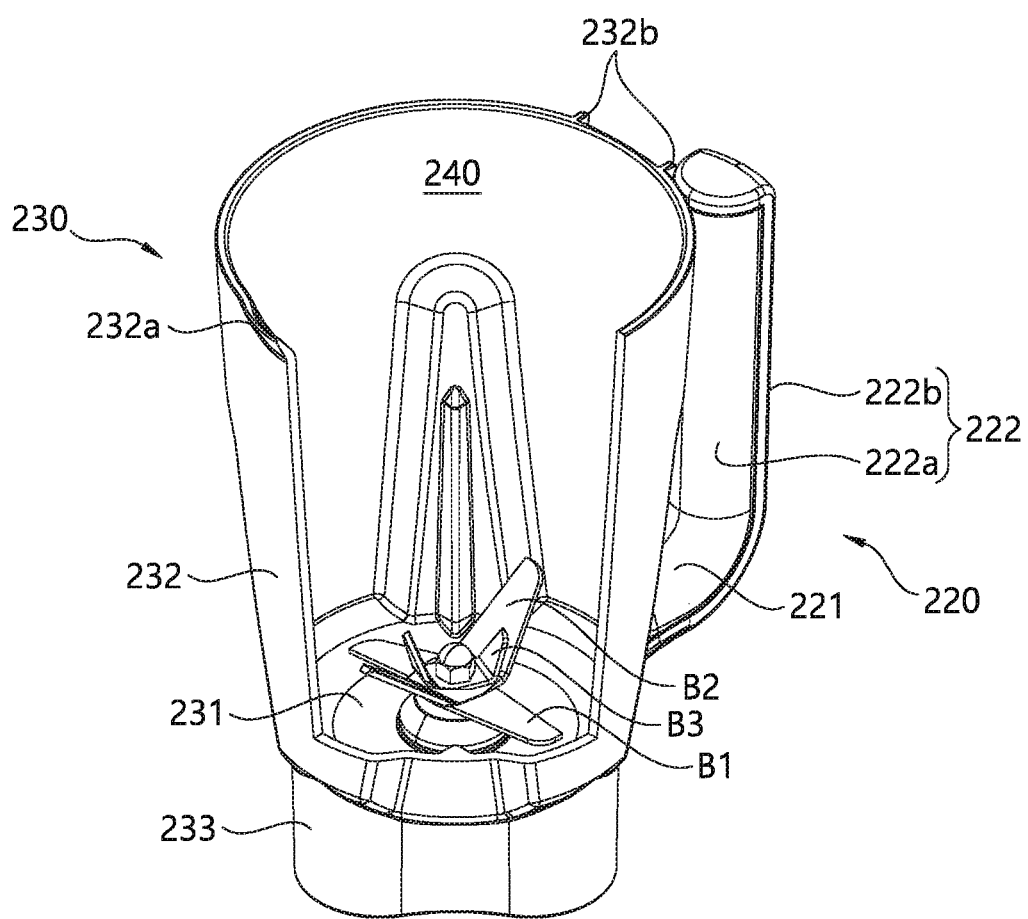
FIG. 6 is a partially cut-away perspective view of the interior of a reservoir shown in FIG. 5.
Figure 7:
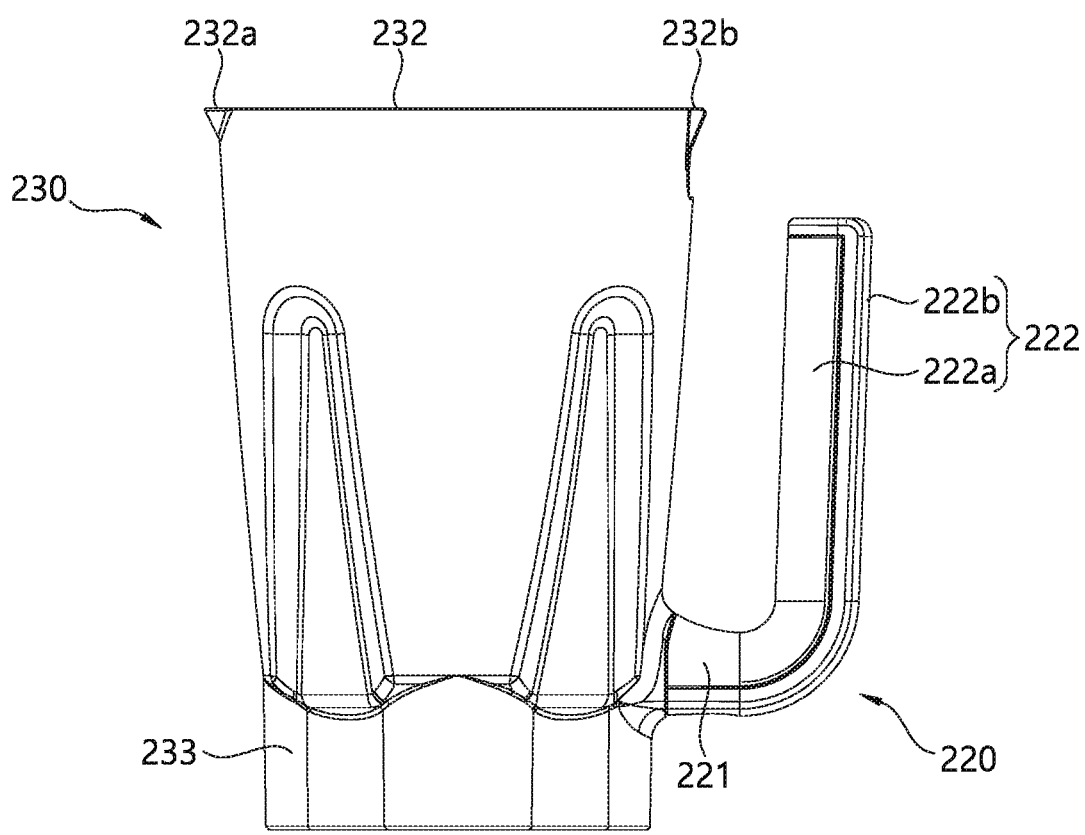
FIG. 7 is a side view of the reservoir shown in FIG. 5 and a handle.
Figure 9:
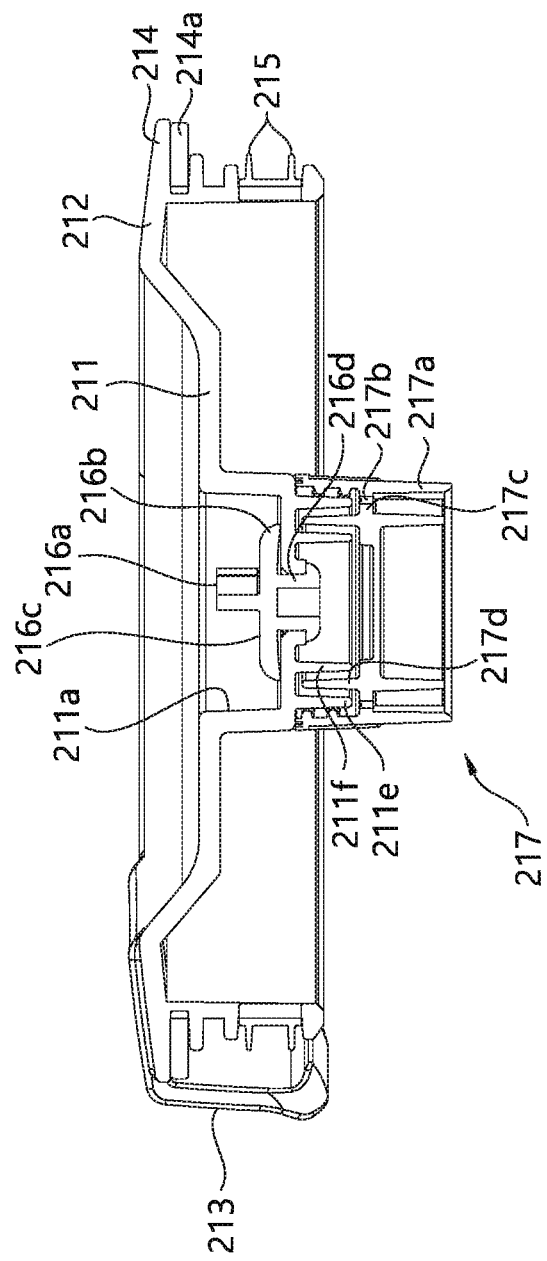
FIG. 9 is a cross-sectional view of the lid shown in FIG. 5.

FIG. 5 is a perspective view of a container of a cooking appliance according to an embodiment of the present invention, FIG. 6 is a partially cut-away perspective view of the interior of a reservoir shown in FIG. 5, FIG. 7 is a side view of the reservoir shown in FIG. 5 and a handle, FIG. 8 is an unfolded perspective view of a lid shown in FIG. 5, and FIG. 9 is a cross-sectional view of the lid shown in FIG. 5.

As shown in FIG. 5, the container 20 includes a lid 210, a handle 220, and a reservoir 230.

As shown in FIG. 6, the reservoir 230 includes a bottom surface 231 and a side wall 232. The side wall 232 extends upwardly from an edge of the bottom surface 231 to form an accommodation space 240 with the bottom surface 231, the accommodation space for accommodating an object to be processed, such as food.

On the bottom surface 231, a plurality of blades B1, B2, and B3 may be provided as processing members for processing an object to be processed. The plurality of blades B1, B2, and B3 are rotatably installed on the bottom surface 231. In the present embodiment, the plurality of blades B1, B2, and B3 are proposed as processing members, but, in some embodiments, processing members other than the blades, such as a screw for extracting juice, a hook for dough, a whisk, etc. may be installed.

A spout 232a may be formed in one side of an upper end of the side wall 232. The spout 232a induces an object to be processed, such that the object flows through the spout 232a when the object in a semi-liquid or liquid form is being poured into a cup or a different container after a processing procedure.

In the other side of the upper end of the side wall 232, a latch 232b to be engaged with a flap 213 of the lid 210 may be formed. In the present embodiment, it is illustrated that one flap 213 is formed on the side of the lid 210 and one latch 232b is formed on the side of the reservoir 230, yet, in some embodiments, one or more flap 213 and one or more latches 232b may be provided.

As shown in FIG. 6, the reservoir 230 may further include a main body insertion end 233 extending downwardly from the lower portion of the bottom surface 231. The main body insertion end 233 may be inserted into a container insertion hole 311 of a container installation end 310 of the main body 30, which is described later, so as to cause the container 20 to be seated on and fixed to the main body 30. To this end, an outline shape of the main body insertion end 233 and an outline shape of the container insertion hole 311 may be formed to correspond to each other.

As shown in FIGS. 5 to 7, the handle 220 protrudes outwardly from the side wall 232 to extend approximately upward. The handle 220 includes a base portion 221 protruding outwardly from the side wall 232, and a grip portion 222 extending upwardly from the base portion 221. The grip portion 222 is a portion held by a hand when a user lifts the container 20. Unlike a container used for an existing blander, the container 20 according to the present embodiment is formed with the handle 220 extending upward.

The base portion 221 protrudes toward an outer side from a lower side of the side wall 232 at a point of a height equal to or lower than ½ of a height of the side wall 232. As shown in FIGS. 4 to 7, the base portion 221 may protrude outwardly of the side wall 232 at a height close to the bottom surface 231.

The grip portion 222 extends upwardly from the base portion 221, while spaced apart from the side wall 232. A space between the grip portion 222 and the side wall 232 is a space into which a portion of the side surface 111 of the enclosure 10, where the handle through hole 112 is formed, is inserted.

An outer side surface of the grip portion 222 includes a first outer side surface 222a facing the side wall 232, and a second outer side surface 222b not facing the side wall 232. The first outer side surface 222a is a surface close to the side wall 232 compared to the second outer side surface 222b, and the second outer side surface 222b is a surface positioned distal from the side wall 232 compared to the first outer surface 222a.

The first outer surface 222a is a portion held by fingers of a user when the user holds the grip portion 222. Thus, as shown in FIGS. 5 and 6, the first outer side surface 222a is formed to include a curved surface protruding toward the side wall 232.

On the other hand, the second outer side surface 222b is a portion to be brought into contact with the user's palm. Thus, the second outer side surface 222b may be formed to include a curved surface protruding in a direction opposite to the side wall 232, but a curvature of the curved surface of the first outer side surface 222a is preferably greater than a curvature of the second outer side surface 222b.

In the present embodiment, an example in which the grip portion 222 is formed to extend upwardly in a vertical direction, yet an extending direction of the grip portion 222 may vary in some embodiments. For example, a part of the grip portion 222 may be formed to be inclined toward the side wall 232 so as to become adjacent to the side wall 232 upwardly.

As shown in FIG. 5, the lid 210 covers an opened upper end of the reservoir 230 to seal the accommodation space 240 in the reservoir 230. The lid 210 is detachably coupled to the reservoir 230.

As shown in FIGS. 8 and 9, the lid 210 includes a lid body 212 to be seated on the upper end of the reservoir 230.

In one side of the lid body 212, a spout shielding part 214 is formed. When the lid 210 is coupled to the reservoir 230, the spout shielding part 214 is seated on the spout 232a to thereby seal the spout 232a. As shown in FIG. 9, a sealing member 214a for improving sealing with the spout 232a may be provided at a lower portion of the spout shielding part 214.

The flap 213 is formed in the other side of the lid body 212. One side of the flap 213 is fixed to the lid body 212, and the other side thereof is formed to be folded at least once. When the lid 210 is coupled to the reservoir 230, the flap 213 is coupled to the latch 232b of the container 20 so that the lid 210 can be fixed to the reservoir 230.

At a lower portion of the lid body 212, an annular sealing member 215 is exposed outwardly. With the lid 210 being coupled to the reservoir 230, the annular sealing member 215 is brought into an inner side surface of the side wall 232 of the reservoir 230. The annular sealing member 215 causes the lid 210 to be fixed to the reservoir 230 and efficiently seal the accommodation space 240 at the same time.

At a central portion of the lid body 212, a suction part receiving end 211 is formed. The suction part receiving end 211 forms a height lower than an upper end of the lid body 212, thereby forming a step with the upper end of the lid body 212. When the enclosure 10 is installed to the main body 20 having the container installed thereto, a space formed due to a difference in height between the upper end of the lid body 212 and the suction part receiving end 211 becomes a space which accommodates the suction part 115 of the enclosure 10.

At a central portion of the suction part receiving end 211, a check valve installation space 211a where a check valve 216 is installed is formed. In a bottom surface 211d of the check valve installation space 211a, a first through hole 211b and a second through hole 211c are formed. The first through hole 211b is a space where a post 216d of the check valve 216 is inserted, and the second through hole 211c is a passage through which air inside the reservoir 230 is exhausted.

At a lower portion of the bottom surface 211d of the check valve installation space 211a, a first upper partition 211e and a second upper partition 211f extend downwardly. The first upper partition 211e and the second upper partition 211f may be formed in an annular shape and may be arranged concentrically about the first through hole 211b. With a filtering member 217 which is described later on, the first upper partition 211e and the second upper partition 211f forms an exhaust passage that is formed in a bent shape in a vertical direction, and a detailed description thereof is provided later on.

As shown in FIGS. 8 and 9, the lid 210 includes a check vale 216.

The check valve 216 includes a valve body 216b and 216c, a rug 216a, and a post 216d.

As illustrated in FIG. 9, the post 216d of the check valve 216 is inserted into the first through hole 211b. A lower end of the post 216d may be formed in a hook shape in such a way as to pass through the first through hole 211b and thereby hook-coupled to a periphery of the first through hole 211b. Thus, the check valve 216 is not deviated unless a force of pulling upwardly is equal to or greater than a predetermined level.

The valve body 216b and 216c has a diameter greater than a diameter of the first through hole 211b and seated on the bottom surface 211d of the check valve installation space 211a. A central portion 216b of the valve body 216b and 216c may be installed in such a way as to press the bottom surface 211d of the check valve installation space 211a and thereby seal the first through hole 211b.

A peripheral portion 216c of the valve body 216b and 216c is positioned to cover the first through hole 211c. The peripheral portion 216c is formed of a soft material, and, when vacuum pressure is provided to the check valve installation s flexible 211a, an upper side of the peripheral portion 216c bends to thereby open the second through hole 211c.

The rub 216a is formed to extend upwardly from the valve body 216b and 216c. To separate the check valve 216 from the lid 210 in the course of cleaning or the like, a user may hold and pull the rug 216a so that the check valve 216 can be separated from the lid 210.

As shown in FIGS. 8 and 9, the lid 210 includes a filtering member 217.

The filtering member 217 includes a filter body 217a, a plurality of inflow holes 217b, a horizontal partition 217c, and a lower partition 217d.

The filter body 217a forms an outermost portion of the filtering body 217. The filtering body 217a has an approximate cylindrical shape, and a plurality of protrusions (not shown) may be formed in an outer side surface of the filtering body, and a screw thread corresponding to a screw thread of the filter body 217a may be formed in an outer side surface of the first upper partition 211e.

The filtering member 217a is installed by screw-coupling between the outer side surface of the first upper partition 211e and a filter inner side surface. The plurality of protrusions formed in the outer side of the filter body 217a is an element for improving griping between the filter body 217a and a user's hand in the course of installing the filtering member 217.

In a state where the filtering member 217 is installed, the lower partition 217d is positioned between the first upper partition 211e and the second upper partition 211f. At this point, the first upper partition 211e is maintained in a separated state from the horizontal partition 217c of the filtering member 217, and the lower partition 217d is maintained in a separated state from the bottom surface 211d of the check valve installation space 211a.

The lower partition 217d may form an annular shape in an interior space of the filter body 217a. The lower partition 217d is supported by the filter body 217a by use of the horizontal partition 217c connecting the lower partition 217d and the filter body 217a.

A plurality of inflow holes 217b penetrating the horizontal partition 217c is formed in the horizontal partition 217c.

In a state where the lid 210 with the check valve 216 and the filtering member 217 installed thereto are coupled to the reservoir 230, if vacuum pressure is provided through the check valve installation space 211a, air in the accommodation space 240 is exhausted through the lid 210 and through the plurality of through holes 217b. At this point, a part of an object to be processed in the accommodation space 240 may be introduced into the filtering member 217. The air and the object introduced through the plurality of inflow holes 217b is raised along a flow path between the first upper partition 211e and the lower partition 217d and is lowered along a flow path between the lower partition 217d and the second upper partition 211f. At this point, the object cannot go toward the second through hole 211c due to a force of gravity and/or an inertia force, and is collected at a bottom of the filter body 217a and thus only the air is allowed to pass through the second through hole 211c and be exhausted to the outside of the lid 210.

When a supply of vacuum pressure through the check valve installation space 211a is stopped, the check valve installation space 211a returns to the atmospheric pressure and pressure in the accommodation space 240 is reduced compared to the check valve installation space 211a. Thus, due to a difference in pressure between the check valve installation space 211a and the accommodation space 240, the peripheral portion 216c of the valve body 216b and 216c is brought into contact with the bottom surface 211d while covering the second through hole 211c, thereby preventing outdoor air from inflowing to the accommodation space.

When washing the container 20, a user may separate the filtering member 217 and remove a processed object remaining in the filter body 217a.

Figure 10:
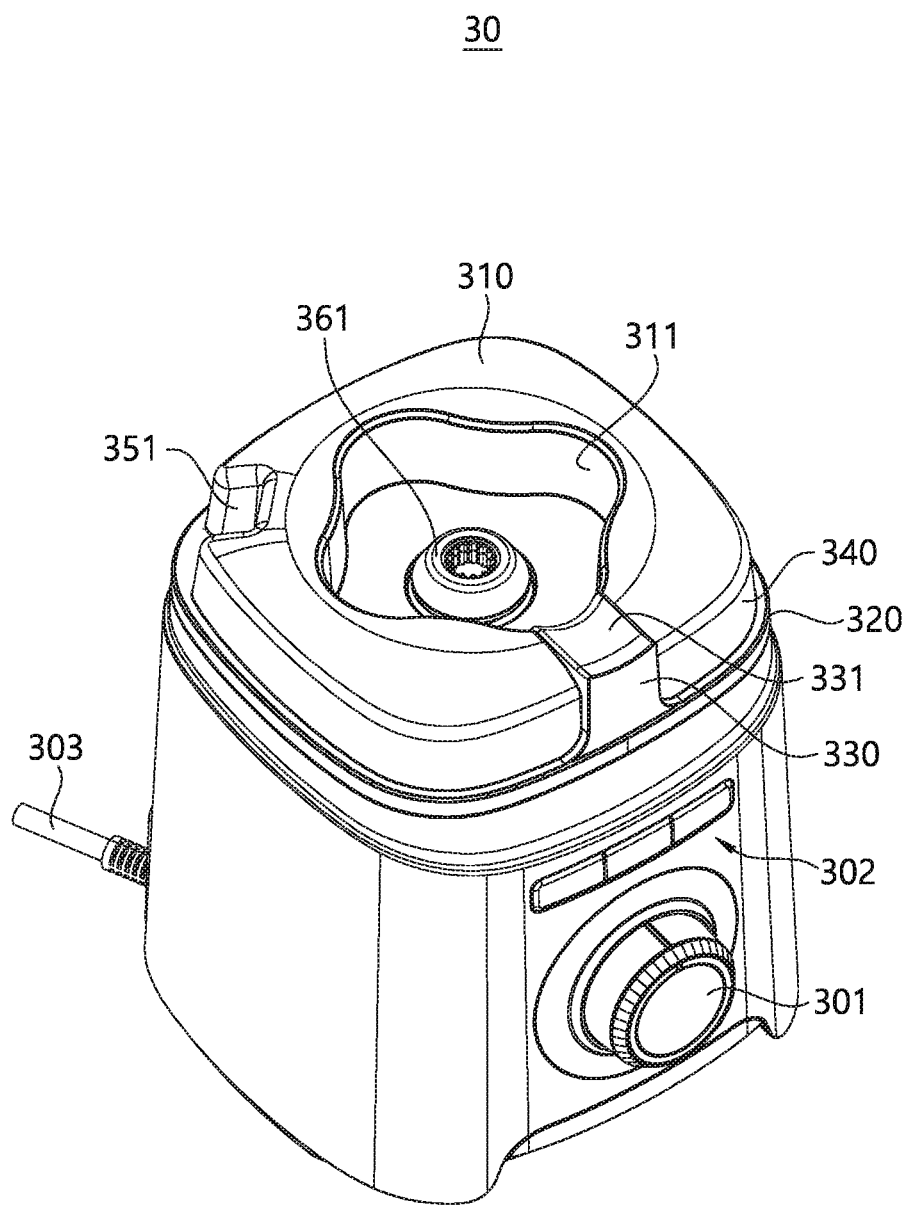
FIG. 10 is a perspective view of the main body shown in FIG. 1.
Figure 11:
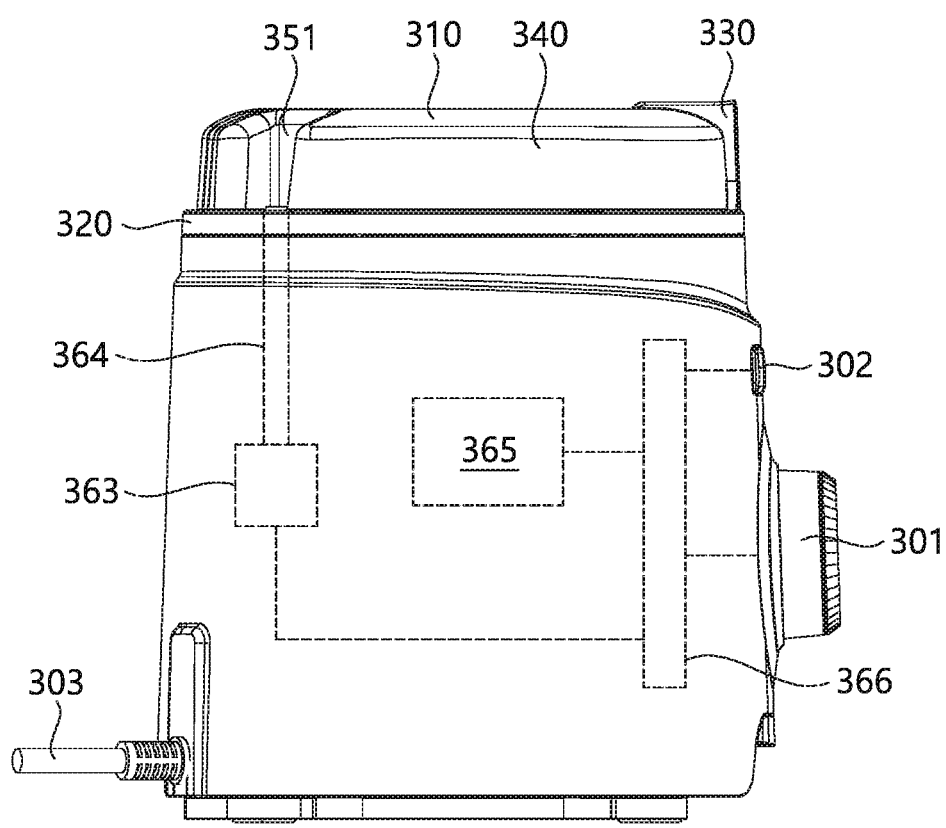
FIG. 11 is a side view of the main body shown in FIG. 1.
Figure 12:
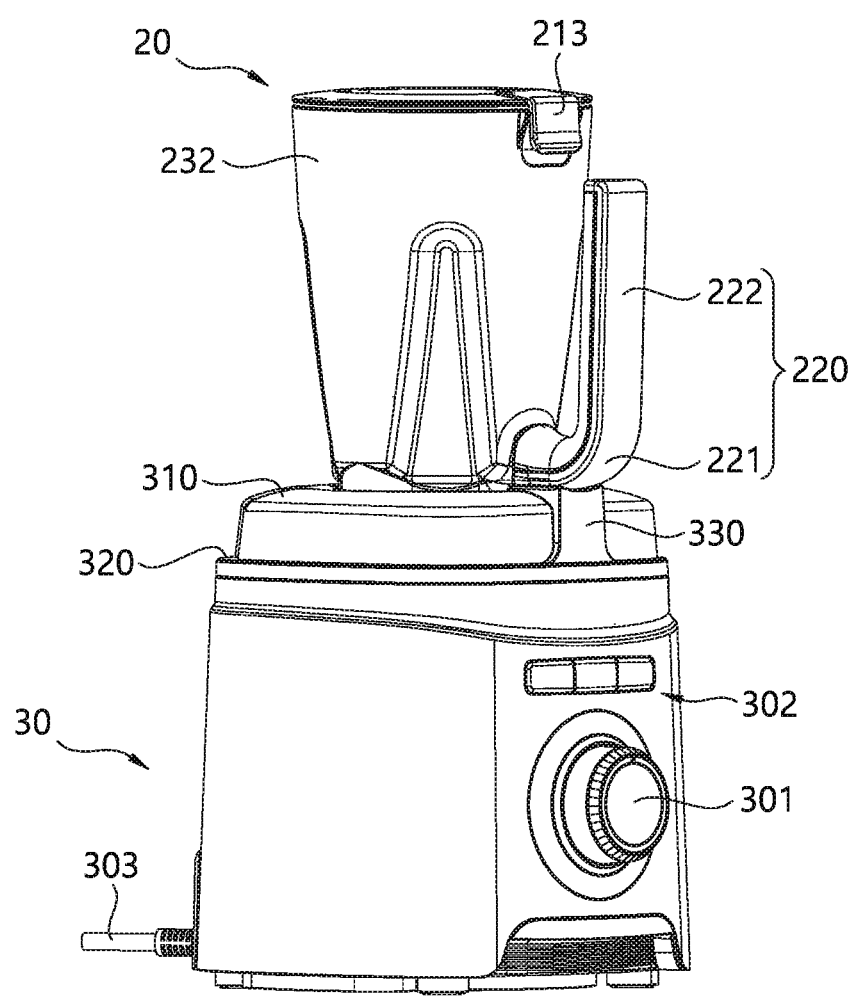
FIG. 12 is a perspective view showing a state in which a container is installed to a main body of a cooking appliance according to an embodiment of the present invention.

FIG. 10 is a perspective view of the main body shown in FIG. 1, FIG. 11 is a side view of the main body shown in FIG. 1, and FIG. 12 is a perspective view showing a state where a container is installed to a main body of a cooking appliance according to an embodiment of the present invention.

As illustrated in FIG. 10, a manipulation part 301 and 302 are provided in a front surface of the main body 30. The manipulation part 301 and 302 may include a dial manipulation part 301 and a button manipulation part 302. For example, the dial manipulation part 301 may be configured to control an operation time of a cooking appliance 1, a rotational speed of the processing members B1, B2, and B3, etc. and the button manipulation part 302 may be configured to select an operation mode of the cooking appliance 1.

The cooking appliance 1 may be operated in a first mode for operating the processing members B1, B2, and B3 to process an object to be processed, a second mode for forming a negative pressure in the accommodation space 240, and a third mode for forming a negative pressure in the accommodation space 240 and then operating the processing members B1, B2, and B3 to process an object to be processed, and the button manipulation part 302 may be manipulated to operate the cooking appliance 1 in one of the first mode, the second mode, and the third mode. In the second mode, the container 20 may be used as a container having no processing members B1, B2, and B3.

As shown in FIG. 10, a power cord 303 for supplying power to the main body 303 is provided in a rear surface of the main body 30, The container installation end 310 is formed in an upper surface of the main body 30.

The container installation end 310 is an element on which the container 20 is seated so as to be installed to the main body 30, and which allows the enclosure 10 to be fixed to the main body 30. An outline shape of the container installation end 310 is formed to match with a shape of an opened lower end of the enclosure 10.

The container insertion hole 311 is formed in a central portion of the container installation end 310. The container insertion hole 311 is recessed downwardly by a predetermined depth from an upper surface of the container installation end 310. A shape of the container insertion hole 311 corresponds to the main body insertion end 233 of the main body 20. As shown in FIG. 12, the main body insertion end 233 of the container 29 is received in the container insertion hole 311 and installed to the main body 30. Thus, a depth of the container insertion hole 311 is preferably equal to or smaller than a height of the main body insertion end 233.

As shown in FIG. 10, an output shaft 361 of a motor 365 is installed on a bottom surface of the container insertion hole 311 in an exposed manner. The output shaft 361 is configured to rotate integrally with the processing members B1, B2, and B3 of the container, and thus, the output shaft is coupled to a rotational shaft (not shown) exposed through a lower end of the container 20. The rotational shaft and the output shaft 361 are coupled to each other in the course where the container 20 is installed to the main body 30 as the main body insertion end 233 is received in the container insertion hole 311.

An enclosure installation end 320 is formed at a periphery of the container installation end 310. The enclosure installation end 320 is formed at a position lower than the container installation end 310 and thus form a step with the contain installation end 310 to surround the container installation end 310.

The enclosure installation end 320 is a place on which a lower end of the enclosure 10 is seated. More specifically, the enclosure installation end 320 is a place on which a lower end of the side surface 111 of the enclosure 10. An outline shape of the enclosure installation end 320 may be formed to match with an outline shape of the lower end of the enclosure 10. A width of the enclosure installation end 320 may be formed to be approximately equal to a thickness of the side surface 111 of the enclosure 10.

As shown in FIG. 10, an installation end connecting surface 340 for connecting the enclosure installation end 320 of the container installation end 310 is formed in the main body 30.

In a state where the enclosure 10 is installed to the main body 30, the installation end connecting surface 340 comes into contact with an inner side wall of the enclosure 10 so that the enclosure 10 can be fixed to the main body. Thus, a shape of the installation end connecting surface 340 matches with a shape of a lower portion of the interior of the enclosure 10.

A vacuum flow path connecting hole 351 is formed in one side of the container installation end 310. As shown in FIG. 11, one end of a vacuum flow path 364 (a first vacuum flow path) is exposed at a bottom surface of the vacuum flow path connecting hole 351.

The vacuum flow path connecting hole 351 forms a space where a vacuum flow path 122 (a second vacuum flow path) of the enclosure and the cover member 121 are accommodated when the enclosure 10 is installed to the main body 30. In a state where the enclosure 10 is installed to the main body 30 as one end of the first vacuum flow path 364 is exposed at the bottom surface of the vacuum flow path connecting hole 351 and one end 122a of the second vacuum flow path 122 is exposed at a lower end of the enclosure 10, the first vacuum flow path 364 and the second vacuum flow path 122 are fluid-connected. A sealing member or sealing structure for tightly connecting the first vacuum flow path 364 and the second vacuum flow path 122 may be provided at at least one of one end of the first vacuum flow path 364 and one end of the second vacuum flow path 122. In addition, it is configured such that connection between the first vacuum flow path 364 and the second vacuum flow path 122 is canceled simultaneously when the enclosure 10 is separated from the main body 30.

As illustrated in FIG. 10, a protruding end 330 is formed at an upper end of a front surface of the main body 30. The protruding end 330 extends upwardly from the enclosure installation end 320 and the container installation end 310. In some embodiments, the protruding end 330 may extend from the enclosure installation end 320 or the container installation end 310.

As shown in FIG. 12, in a state where the container 20 is installed to the main body 30, the protruding end 330 may be formed at a height close to the base portion 221 of the handle 220. More preferably, in a state where the container 20 is installed to the main body 30, the base portion 221 of the handle 220 may be formed to be seated on the protruding end 330.

An upper surface 331 of the protruding end 330 may have a shape corresponding to a shape of a lower portion of the base portion 221. For example, in the case where the lower portion of the base portion 221 is in a convex shape having a predetermined curvature, the upper surface 331 of the protruding end 330 may be formed to have a concave shape having a curvature approximately identical to the curvature of the lower portion of the base portion 221, as shown in FIG. 10.

As shown in FIG. 1, in a state where the container 20 and the enclosure 10 are installed to the main body 30, the handle through hole 112 of the enclosure 10 may receive the protruding end 330 together with the base portion 221 of the handle 220. In a state where the container 20 and the enclosure 10 are installed to the main body 30, an outer side surface of the enclosure 10 and a front surface of the protruding end 330 may be formed to have an approximately one surface (a flat surface of a curved surface).

As shown in FIG. 11, the main body 30 includes a vacuum pump 363, a flow path 374, the motor 365, and a controller 366.

The motor 365 provides a power for rotating the output shaft 361.

The vacuum pump 363 provides a vacuum pressure to the first vacuum flow path 364. In a state where the container 20 and the enclosure 10 are installed to the main body 30, if the vacuum pump 363 operates, the vacuum pressure is provided to the check valve installation space 211a of the lid 210 through a first vacuum flow path 364 and the second vacuum flow path 122. In addition, if a peripheral portion 216c of the check valve 216 ends upwardly and thereby opens the second through hole 211c, the vacuum pressure is provided to the accommodation space 240 of the reservoir 230 and thus gas in the accommodation space 240 is exhausted through the second vacuum flow path 122 and the first vacuum flow path 364.

The controller 366 is connected to the manipulation part 301 and 302, the motor 365, and the vacuum pump 363, and controls the motor 365 and the vacuum pump 363 according to manipulation of the manipulation part 301 and 302.

Hereinafter, the cooking appliance 1 according to the present embodiment is described based on the above description.

For use of the cooking appliance 1, a user installs the container 20 to the main body 30. In the case of operating the cooking appliance 1 in the first mode for processing an object to be processed in the accommodation space 240 using the processing members B1, B2, and B3, it is not mandatory to install the enclosure 10. However, in the case of operating the cooking appliance 1 in the second mode or the third mode to reduce noise cause by operation of the processing members B1, B2, and B3 or cause the interior of the accommodation space 240 to be in a vacuum state, it is mandatory to install the enclosure 10 to the main body 30.

A user selects an operation mode of the cooking appliance 1 by manipulating the manipulation part 301 and 302.

When the first mode is selected, the controller 366 rotates the moto 365 to rotate the processing members B1, B2, and B3 connected to the output shaft 361 so that an object to be processed in the accommodation space 240 can be processed.

When the second mode is selected and the user manipulates the vacuum manipulation part 114 of the enclosure 10 to bring the suction part 115 of the lid 210 into tight contact with the suction part receiving end 211, the controller 366 operates the vacuum pump 363 to exhaust air in the accommodation space 240, thereby forming a negative pressure in the accommodation space 240. After the operation of the vacuum pump 363 is terminated, if the user causes the suction part 115 by manipulation the vacuum manipulation part 114 in order to separate the enclosure from the main body 30, a space between the enclosure and the lid 210 of the container may change to have the atmospheric pressure and therefore the enclosure 10 can be easily separated from the main body 30.

When the third mode is selected and the user manipulates the vacuum manipulation part 114 of the enclosure 10 to bring the suction part 115 of the lid 210 into tight contact with the suction part receiving end 211, the controller 366 operates the vacuum pump 363 to exhaust air in the accommodation space 240 and thereby form a negative pressure in the accommodation space, and then, the controller rotates the motor 365 to rotate the processing members B1, B2, and B3 connected to the output shaft 361, so that an object to be processed in the accommodation space 240 can be processed.

In the cooking appliance 1 according to the present embodiment, since the handle 220 of the container 20 has a shape of protruding outwardly from a lower end of a side surface of the reservoir 230 and extending upwardly, the entire of the container 20, except for the handle 220, can be covered using the single enclosure 10 in the dome shape. Therefore, it is possible to efficiently improve noise shielding performance and it is not necessary to form the enclosure 10 in a structure of which an upper part and a lower part are divided.

In addition, since the enclosure 10 covers the container 20 so as to be positioned outside the handle 220 of the container 20, the enclosure may be formed in a compact size and therefore a horizontal area occupied by the cooking appliance 1 can be reduced.

In addition, as the enclosure installation end 320 is formed at a lower portion of the exterior of the container installation end 310, the enclosure installation end covers not just the reservoir 230 but also the upper end of the main body so that noise occurring during operation of the processing members B1, B2, and B3 can be shielded effectively.

Hereinafter, a container according to other embodiments of the present invention is described.

FIGS. 13 to 16 are side view schematically illustrating a reservoir and a handle of a container according to other embodiment of the present invention. For convenience of description, the same reference numerals are used for elements similar to those from the above-described previous exemplary embodiment, and descriptions of elements that the present exemplary embodiment has in common with the previous exemplary embodiment will be omitted.

As shown in FIGS. 13 to 16, containers 20a, 20b, 20c, and 20d according to other embodiments of the present invention have handles having shapes different from a shape of the container 20 according to the above-described embodiment.

Figure 13:
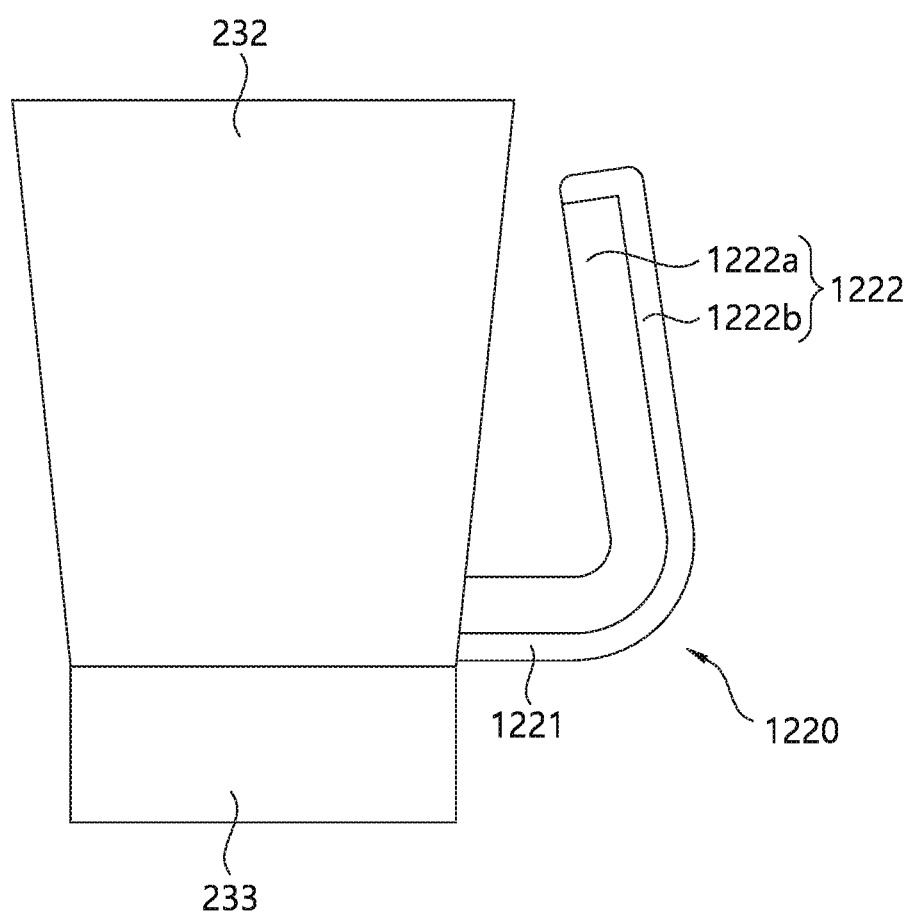
FIGS. 13 to 16 are side view schematically illustrating a reservoir and a handle of a container according to other embodiments of the present invention.

A container 20a according to an embodiment shown in FIG. 13 is formed such that a grip portion 1222 of a handle 1220 becomes adjacent to a side wall 232 of a reservoir upwardly from a base portion 1221.

Accordingly, as shown in FIG. 13, both a first outer side surface 1222a and a second outer side surface 1222b of the grip portion 1222 are formed to become adjacent to the side surface 232 of the reservoir.

That is, the grip portion 1222 does not extend in a vertical direction from the base portion 1221 and is formed to extend to be inclined toward the side wall 232 of the reservoir. However, in order for a side surface 111 of an enclosure 10 to enter in between the side wall 232 of the reservoir and the grip portion 1222, an upper end of the grip portion 1222 is separated from the side wall 232.

While the grip portion 222 in the container 20 according to the above-described embodiment extends approximately in the vertical direction, the container 20a according to the embodiment shown in FIG. 13 extends to be inclined toward the side wall 232 of the reservoir and thus a user can more easily lift the container 20a when separating the container 20a from the main body 30.

Figure 14:
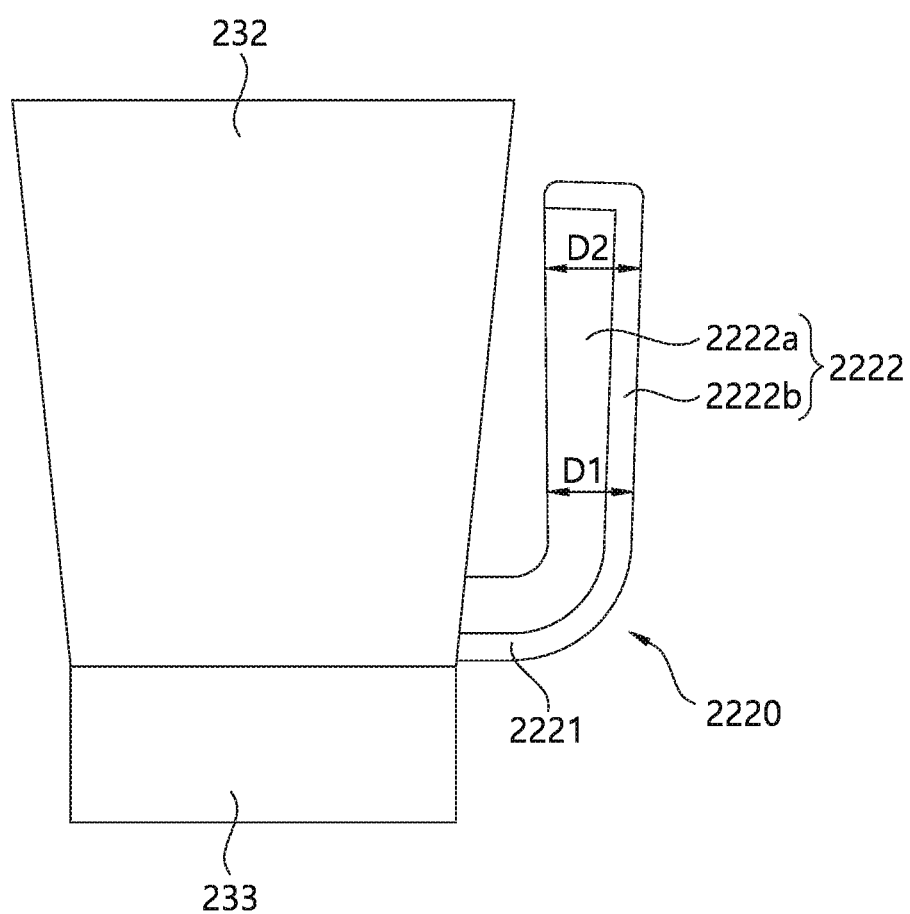

In a container 20b according to an embodiment shown in FIG. 14, a first outer side surface 2222a of a grip portion 2222 of a handle 2220 extends to become adjacent to a side wall 232 of a reservoir upwardly, a second outer side surface 222b extends approximately in a vertical direction.

Thus, a distance D2 between the first outer side surface 222a and the second outer side surface 222b at an upper portion of the grip portion 2222 is greater than a distance D1 between the first outer side surface 222a and the second outer side surface 222b at a lower portion of the grip portion 2222. That is, the grip portion 2222 is formed in such a way that a distance between the first outer side surface 222a and the second outer side surface 222b increases upwardly.

In the container 20b according to the embodiment shown in FIG. 14, as the first outer side surface 2222a extends to be inclined toward the side wall 232 of the reservoir, a user can more easily lift the container 20b when separating the container 20b from the main body 30.

Figure 15:
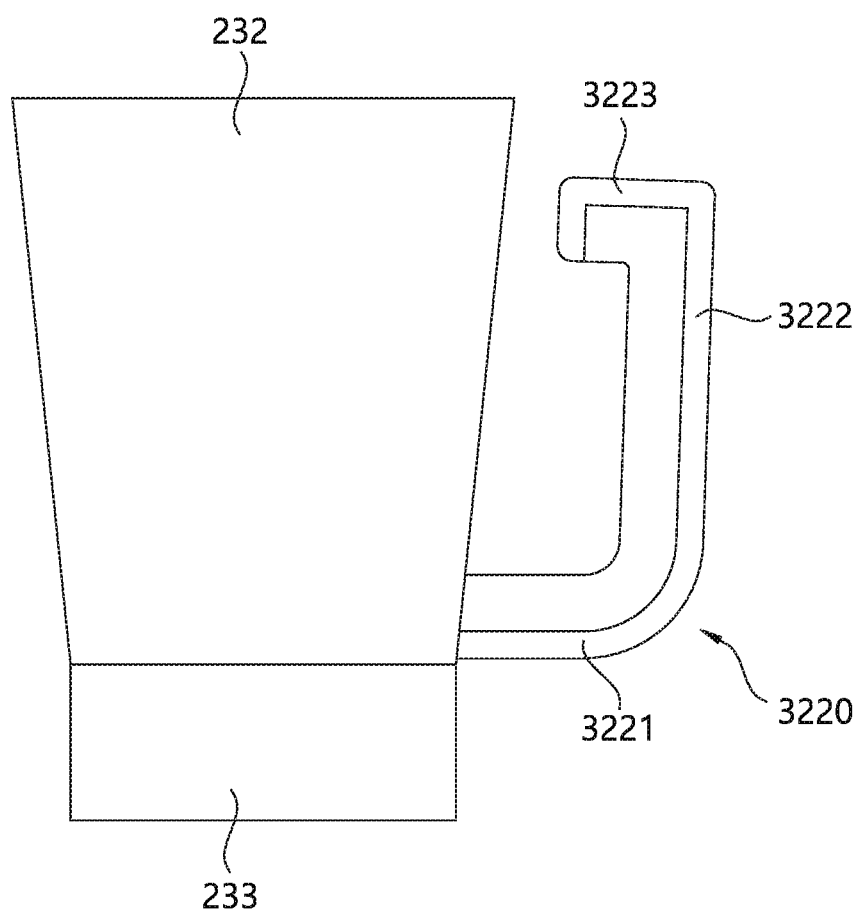

Even in a container 20c according to an embodiment of FIG. 15, a handle 3220 further includes a stopping portion 3223 in addition to a base portion 3221 and a grip portion 3222. The stopping portion 3223 is formed to extend toward a side wall 22 from an end of the grip portion 3222. However, in order for a side surface 111 of an enclosure 10 to enter in between a side wall 232 of a reservoir and the grip portion 322, the stopping portion 3223 is formed to be separated from the side wall 232.

When a user holds the grip portion 3222 with his/her hand, the partition portion 3223 functions as a stopping part at an upper end of the grip portion 3222, so that a user can lift the container 20c more stably.

Figure 16:
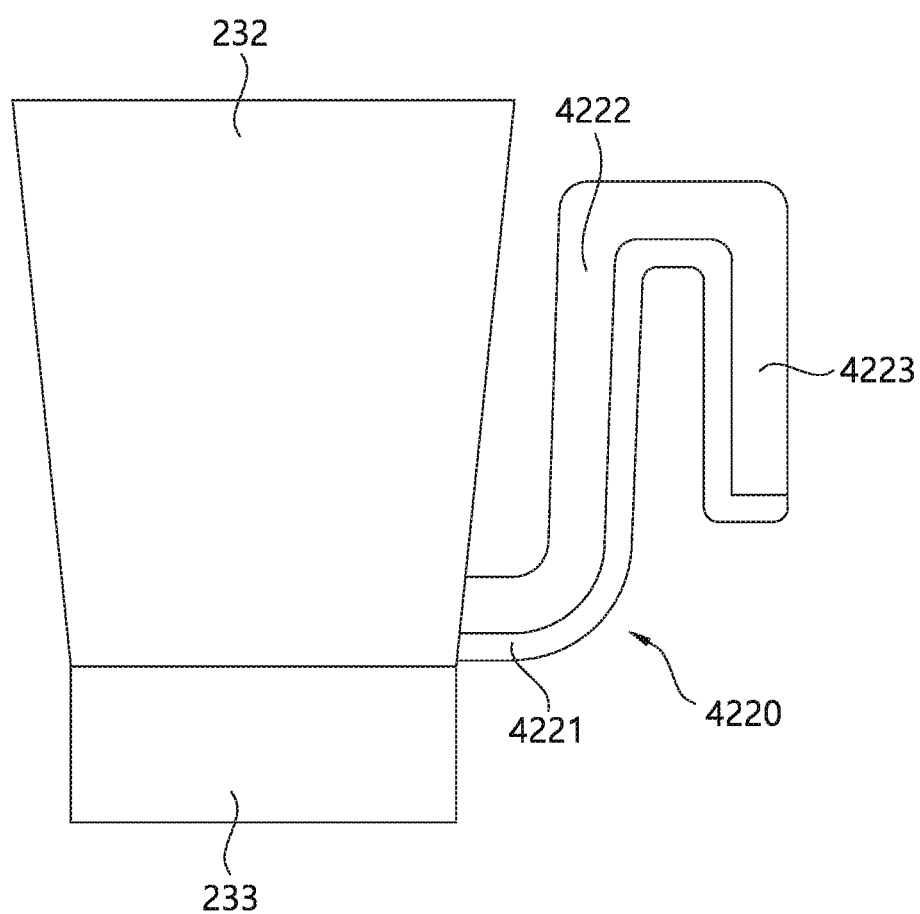

Even in a container 20d according to an embodiment of FIG. 16, a handle 4220 also further include a stopping portion 4223 in addition to a base portion 4221 and a grip portion 4222. However, in the present embodiment, the stopping portion 4223 is formed to extend outwardly from an end of the grip portion 4222. That is, the stopping portion 4223 is formed to extend in a direction away from a side wall 232. As shown in FIG. 16, the stopping portion 4223 may have a shape extending outwardly from an upper end of the grip portion 4222 and then extending downwardly.

The container 20d according to the embodiment of FIG. 16 is configured such that a user to grip the grip portion 4222 by putting a finger in between the stopping port 4223 and the grip portion 4222, and the stopping portion 4223 functions as a stopping part at an upper end of the grip portion 4222 so that the user can lift the container 20d more stably.

Those of ordinary skill in the art to which the present disclosure pertains should understand that the present disclosure may be practiced in other specific forms without changing the technical idea or essential features thereof. Therefore, the embodiments described herein are illustrative in all aspects and should not be understood as limiting. The scope of the present disclosure is shown by the claims below rather than the detailed description given above, and all changes or modifications derived from the meaning and the scope of the claims and their equivalents should be interpreted as belonging to the scope of the present disclosure.

MODE FOR INVENTION

A cooking appliance according to an embodiment of the present invention includes: a main body; a container detachably installed to an upper portion of the main body, and comprising a reservoir for accommodating an object to be processed and a handle portion protruding laterally from the reservoir; and an enclosure detachably installed to the upper portion of the main body to surround the reservoir, wherein the enclosure is formed in a dome shape having an opened lower end and has a handle through hole extending from the opened lower end and formed in a part of a side surface of the enclosure, so that at least a part of the handle penetrates the handle through hole and is exposed to an outside in a state where the enclosure is installed to the main body with the container.

The handle may include a base portion protruding laterally from a lower portion of the reservoir, and a grip portion extending upwardly from the base portion.

In a state where the container and the enclosure are installed to the main body, at least a part of the base portion may be accommodated in the handle through hole.

In a state where the container and the enclosure are installed to the main body, a part of a side surface of the enclosure may be positioned between the reservoir and the base portion.

The main body may include: a container installation end to which the container is detachably installed; and an enclosure installation end which is formed to surround the container installation end to allow a lower end of the enclosure to be seated thereon.

The handle may include a base portion protruding laterally from a lower portion of the reservoir, and a grip portion extending upwardly from the base portion, and the main body may further include a protruding end extending upwardly from at least one of the container installation end or the enclosure installation end to become adjacent to the lower portion of the base portion.

In a state where the container is installed to the main body, the base portion may be supported by the protruding end.

In a state where the container and the enclosure are installed to the main body, the base portion and at least a part of the protruding end may be received in the handle through hole.

In a state in which the enclosure is installed to the main body, the container installation end may be accommodated in the enclosure.

The main body may further include an installation connecting surface that connects an upper end of the container installation end and the enclosure installation end, and, in a state where the enclosure is installed to the main body, the installation end connecting surface may be brought into contact with an inner side surface of the enclosure so that the enclosure is fixed to the main body.

The main body may further include a vacuum pump, and a first vacuum flow path fluid-connected to the vacuum pump and exposed through the upper portion of the main body, and the enclosure may further include a second vacuum flow path fluid-connecting the first vacuum flow path and an interior space of the reservoir in a state where the container and the enclosure are installed to the main body.

One end of the second vacuum flow path may be exposed toward a lower end of the enclosure, and the second vacuum flow path and the first vacuum flow path may be fluid-connected simultaneously when the enclosure is installed to the main body The second vacuum flow path may be disconnected from the first vacuum flow path simultaneously when the enclosure is separated from the main body.

Meanwhile, a container according to an embodiment of the present invention includes: a bottom surface; a blade rotatably installed on the bottom surface; a side wall forming, with the bottom surface, an accommodation space for accommodating an object to be processed; and a handle comprising a base portion protruding outwardly from the side wall, and a grip portion extending upwardly from the base portion.

The base portion may be formed to protrude at a point of a height equal to or lower than ½ of a height of the side wall.

The base portion may be formed to protrude from the side wall at a height close to the bottom surface An outer side surface of the grip portion may include a first outer side surface facing the side wall, and a second outer side surface not facing the side wall.

The first outer side surface may be formed to have a curved surface protruding toward the side wall.

A curvature of the first outer side surface may be greater than a curvature of the second outer side surface.

The first outer side surface may include a portion formed to become adjacent to the side wall upwardly.

At least a part of the grip portion may be formed in such a manner that a distance between the first outer side surface and the second outer side surface increases upwardly.

An upper end of the grip portion may be spaced apart from the side wall.

The handle may further include a stopping part extending from the grip portion toward the side wall so that the handle is spaced apart from the side wall.

The handle may further include a stopping portion extending outwardly from the grip portion.

The invention claimed is:

1. A cooking appliance comprising:
   a main body;
   a container detachably installed to an upper portion of the main body, and comprising a reservoir for accommodating an object to be processed and a handle portion protruding laterally from the reservoir; and
   an enclosure detachably installed to the upper portion of the main body to surround the reservoir,
   wherein the handle portion comprises a base portion protruding laterally from a lower portion of the reservoir, and a grip portion extending upwardly from the base portion, and
   wherein a part of a side surface of the enclosure enters between the grip portion and the reservoir, and in a state where the container and the enclosure are installed to the main body, the part of the side surface of the enclosure is positioned between the reservoir and the grip portion, an upper end of the grip portion being spaced apart from a sidewall of the reservoir.

2. The cooking appliance of claim 1, wherein the enclosure is formed in a dome shape having an opened lower end and has a handle through hole extending from the opened lower end and formed in the part of the side surface of the enclosure, so that at least a part of the handle portion penetrates the handle through hole and is exposed to an outside in a state where the enclosure is installed to the main body with the container.

3. The cooking appliance of claim 2, wherein in the state where the container and the enclosure are installed to the main body, at least a part of the base portion is accommodated in the handle through hole.

4. The cooking appliance of claim 1, wherein the main body comprises:
   a container installation end to which the container is detachably installed; and
   an enclosure installation end which is formed to surround the container installation end to allow a lower end of the enclosure to be seated thereon.

5. The cooking appliance of claim 4,
   wherein the main body further comprises a protruding end extending upwardly from at least one of the container installation end or the enclosure installation end to become adjacent to the lower portion of the base portion.

6. The cooking appliance of claim 5, wherein in a state where the container is installed to the main body, the base portion is supported by the protruding end.

7. The cooking appliance of claim 5, wherein the enclosure has a handle through hole, and
wherein in a state where the container and the enclosure are installed to the main body, the base portion and at least a part of the protruding end are received in the handle through hole.

8. The cooking appliance of claim 4, wherein in a state in which the enclosure is installed to the main body, the container installation end is accommodated in the enclosure.

9. The cooking appliance of claim 8,
wherein the main body further comprises an installation connecting surface that connects an upper end of the container installation end and the enclosure installation end, and
wherein in a state where the enclosure is installed to the main body, the installation end connecting surface is brought into contact with an inner side surface of the enclosure so that the enclosure is fixed to the main body.

10. The cooking appliance of claim 1,
wherein the main body further comprises vacuum pump, and a first vacuum flow path fluid-connected to the vacuum pump and exposed through the upper portion of the main body, and
wherein the enclosure further comprises a second vacuum flow path fluid-connecting the first vacuum flow path and an interior space of the reservoir in a state where the container and the enclosure are installed to the main body.

11. The cooking appliance of claim 10,
wherein one end of the second vacuum flow path is exposed toward a lower end of the enclosure, and
wherein the second vacuum flow path and the first vacuum flow path are fluid-connected simultaneously when the enclosure is installed to the main body.

12. The cooking appliance of claim 10, wherein the second vacuum flow path is disconnected from the first vacuum flow path simultaneously when the enclosure is separated from the main body.

13. A container comprising:
a bottom surface;
a blade rotatably installed on the bottom surface;
a side wall forming, with the bottom surface, an accommodation space for accommodating an object to be processed; and
a handle comprising a base portion protruding outwardly from the side wall, and a grip portion extending upwardly from the base portion,
wherein an upper end of the grip portion is spaced apart from the sidewall so that an enclosure surrounding the sidewall enters between the grip portion and the sidewall.

14. The container of claim 13, wherein an outer side surface of the grip portion comprises a first outer side surface facing the side wall, and a second outer side surface not facing the side wall.

15. The container of claim 14, wherein the first outer side surface is formed to have a curved surface protruding toward the side wall.

16. The container of claim 15, wherein a curvature of the first outer side surface is greater than a curvature of the second outer side surface.

17. The container of claim 14, wherein the first outer side surface comprises a portion formed to become adjacent to the side wall upwardly.

18. The container of claim 14, wherein at least a part of the grip portion is formed in such a manner that a distance between the first outer side surface and the second outer side surface increases upwardly.

* * * * *